July 25, 1950
E. A. STALKER
2,516,489
JET PROPULSIVE MEANS FOR AIRCRAFT EMPLOYING
BOUNDARY LAYER AIR OR OTHER AIR WITH
GAS TURBINE POWER PLANTS
Filed Jan. 16, 1948
3 Sheets-Sheet 1
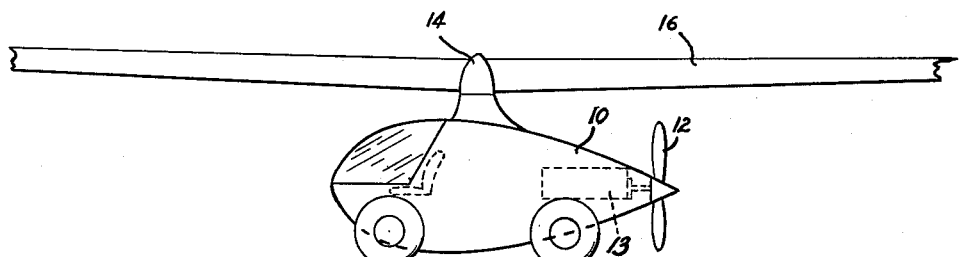
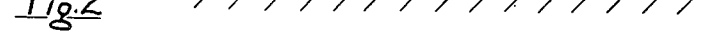
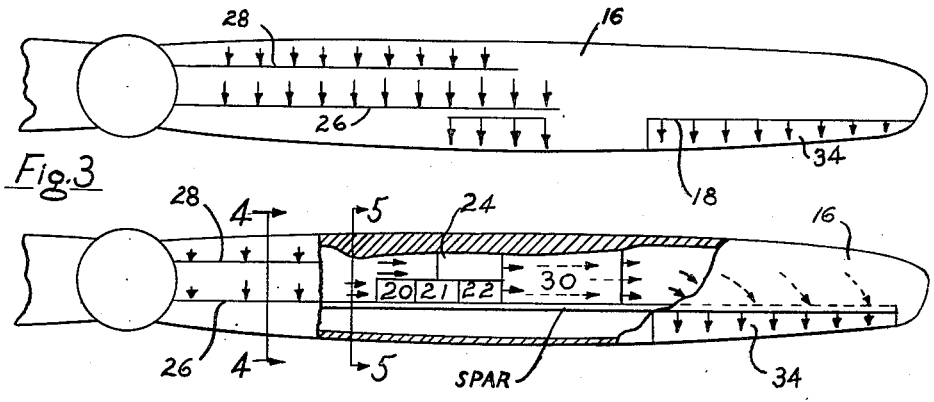
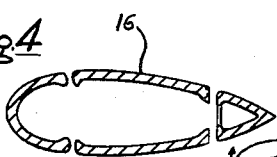
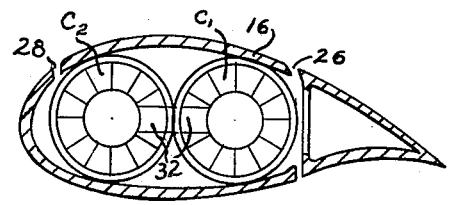
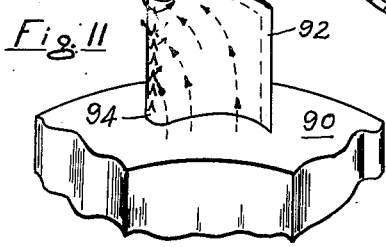
INVENTOR.
Edward A. Stalker July 25, 1950

E. A. STALKER 2,516,489

JET PROPULSIVE MEANS FOR AIRCRAFT EMPLOYING BOUNDARY LAYER AIR OR OTHER AIR WITH GAS TURBINE POWER PLANTS

Filed Jan. 16, 1948

3 Sheets-Sheet 2

INVENTOR.
Edward A. Stalker

INVENTOR.
Edward A. Stalker

Patented July 25, 1950

2,516,489

UNITED STATES PATENT OFFICE 2,516,489

JET PROPULSIVE MEANS FOR AIRCRAFT EMPLOYING BOUNDARY LAYER AIR OR OTHER AIR WITH GAS TURBINE POWER PLANTS

Edward A. Stalker, Bay City, Mich.

Application January 16, 1948, Serial No. 2,605

16 Claims. (Cl. 170—135.4)

My invention relates to the propulsion of aircraft particularly to propulsion means of low fuel consumption.

An object of the invention is to provide a means of propelling aircraft which is economical of fuel.

Another object is to provide an economical propulsive means which can be housed in a limited space.

Another object is to provide an economical jet propulsion means for helicopters.

Another object is to provide a propulsive means employing boundary layer air.

Still another object is to provide a unique propulsive means incorporating a heat exchanger.

Other objects will appear from the description drawings and claims.

Figure 6:
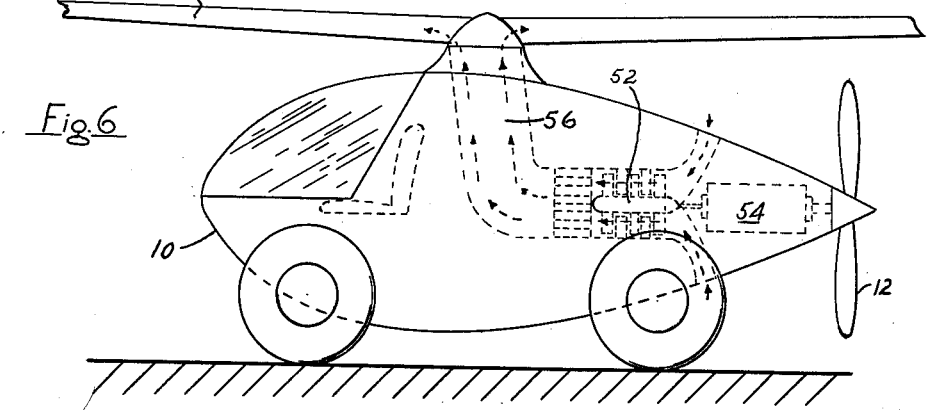
Figure 7:
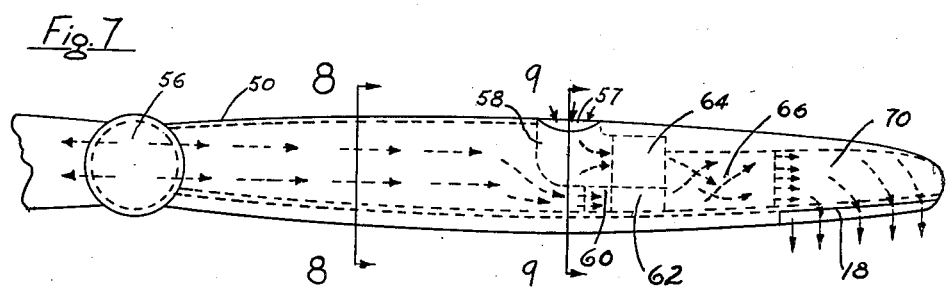
Figure 8:
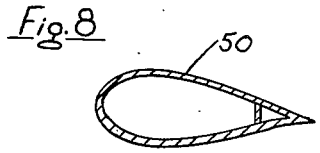
Figure 9:
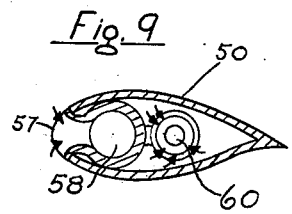
Figure 10:
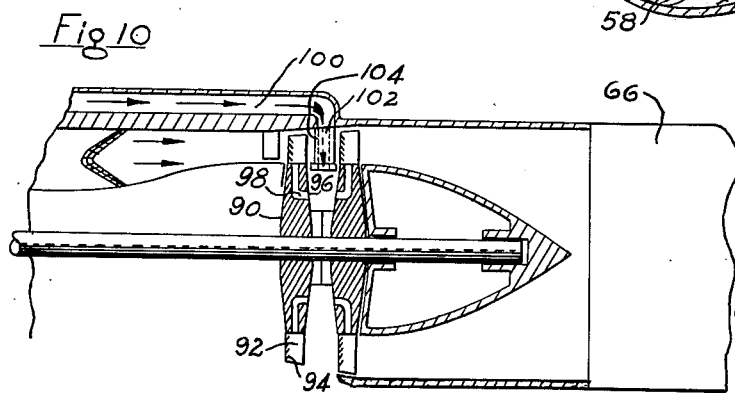
Figure 1A:
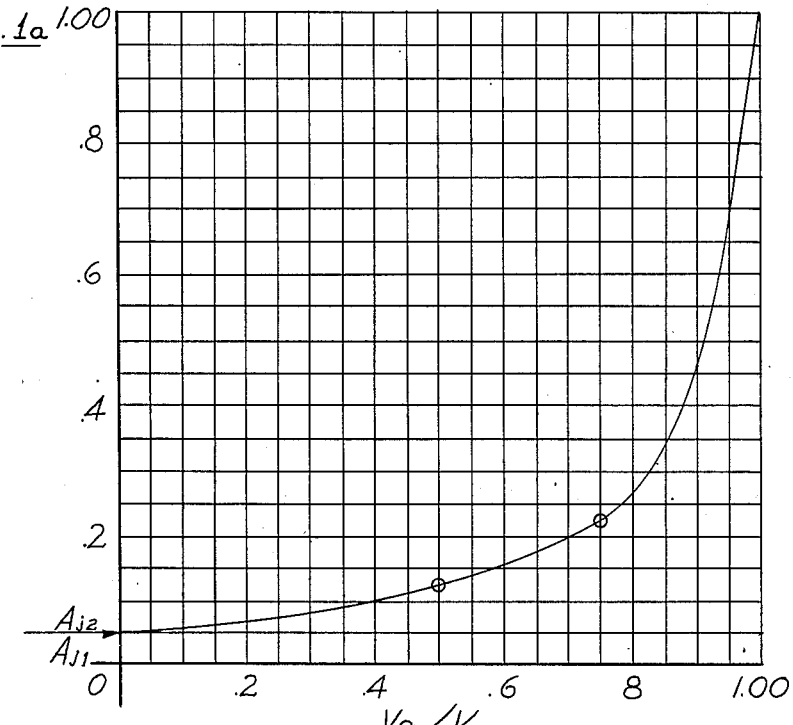
Figure 12:
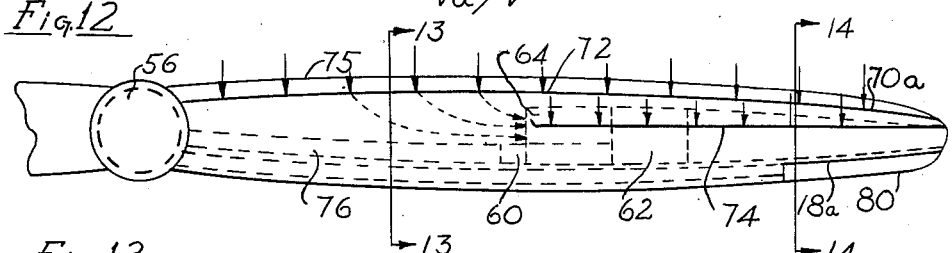
Figure 13:
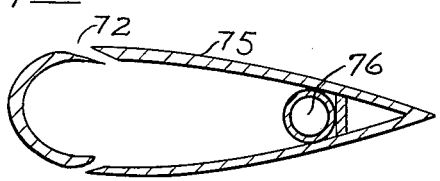
Figure 14:
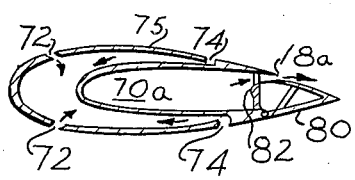

Fig. 1a pertains to the theory;
Fig. 1 is a side elevation of the helicopter;
Fig. 2 is a fragmentary top plan of the rotor;
Fig. 3 is a fragmentary top plan of the rotor with portions of the wing in section;
Fig. 4 is a section along the line 4—4 in Fig. 3;
Fig. 5 is a section along the line 5—5 in Fig. 3;
Fig. 6 is a diagrammatic side elevation of a helicopter incorporating another form of the invention;
Fig. 7 is a fragmentary top plan view of the helicopter rotor of Fig. 6;
Fig. 8 is a section along the line 8—8 in Fig. 7;
Fig. 9 is a section along the line 9—9 in Fig. 7;
Fig. 10 is a fragmentary axial section through the turbine;
Fig. 11 is perspective view of a turbine blade on a fragment of the turbine rotor hub;
Fig. 12 is a top plan view of another wing according to the invention;
Fig. 13 is a section along the line 13—13 in Fig. 12; and
Fig. 14 is a section along line 14—14 in Fig. 12.

This invention discloses a gas turbine propulsive means which can be housed within limited space. It is also one which operates with a very low fuel consumption. The weight per horse power of the power plant is very much less than that of other power plants.

The power plant is particularly suited to helicopters and high speed aircraft where it is desirable to house the propulsive unit in the wing and to those aircraft where a low fuel consumption is important.

The important features of the invention include the use of a gas turbine of high inlet temperature coupled with a regenerator. The high temperature leads to a very great reduction in turbine size and a very great reduction in regenerator size. A further reduction in size and weight of the regenerator is obtained by using boundary layer air to form the stream of cold fluid to be heated since as will be shown below the use of boundary layer air results in the reduction of the mass of air required for an effective propulsive jet and thus in a great reduction of the cross sectional area of the stream of fluid. A regenerator which must pass this flow is therefore accordingly of only very small cross sectional area.

If the regenerator to pass the cold fluid to be heated is small in cross section it must be served by a stream of exhaust gas of small cross section. Therefore to deliver enough heat to the cold fluid the exhaust gas must be at a high temperature. This is assured by providing a turbine which can be operated at a high inlet temperature.

That the cross section of the stream of fluid to form the propulsive jet can be made very small, is shown by the following analysis.

For the consideration of the propulsion of an aircraft by a jet the following notation will be found useful. Let—

$V$=flight velocity (assumed the same for all cases to be considered).
$V_a$=velocity of approach of the air relative to the propulsive device.
$\rho$=mass density of air
$A_j$=cross sectional area at the jet discharge opening
$V_j$=jet velocity at the discharge opening.

Then in the general case the mass of air flowing in the jet is $$m = \rho A_j V_j \qquad (1)$$

In this same case the propulsive device, such as a jet engine, propeller and the like, takes air at the velocity $V_a$ and changes its velocity by the amount $w$ to an exit velocity of $V_j$. Since thrust is equal to the change in velocity imparted to a mass per unit of time, then $$T = m(V_j - V_a) \qquad (2)$$

Also in the general case it can be shown that the efficiency is $$E = \frac{2V}{V_j + V_a} \qquad (3)$$

This efficiency is for the jet only and does not include any compressor or duct losses.

For the commonly treated case the velocity of approach to the device is the same as the speed of flight, as for instance, in the case of the propeller. That is, $V_a=V$. Using the symbols of the general case but with subscript 1—

$$m_1 = \rho A_{j_1} V_{j_1} \tag{4}$$

$$T_1 = m_1(V_{j_1}-V) = \rho A_{j_1} V_{j_1}(V_{j_1}-V) \tag{5}$$

$$E_1 = \frac{2V}{V_{j_1}+V} \tag{6}$$

If the propulsive device can be supplied with air which has a very low velocity in comparison to the speed of flight the efficiency of propulsion will be increased as can be seen from the limiting case where $V_a=0$. In this instance, using the same symbols but with the subscript 2—

$$m_2 = \rho A_{j_2} V_{j_2} \tag{7}$$

$$T_2 = m_2 V_{j_2} = \rho A_{j_2} V_{j_2}^2 \tag{8}$$

$$E_2 = \frac{2V}{V_{j_2}} \tag{9}$$

The great reduction in cross-sectional area of the jet using air received at $V_a=0$ for equal thrusts may be seen by equating the thrust of (5) and (8). Thus—

$$A_{j_1} V_{j_1}(V_{j_1}-V) = A_{j_2} V_{j_2}^2 \tag{10}$$

leading to $$\frac{A_{j_2}}{A_{j_1}} = \frac{V_{j_1}(V_{j_1}-V)}{V_{j_2}^2} \tag{11}$$

If the jets are also to have the same jet efficiencies equate Equations 6 and 9 and solve for $V_{j_2}$.

$$V_{j_2} = V_{j_1}+V \tag{12}$$

Now substitute for $V_{j_2}$ in (11) giving $$\frac{A_{j_2}}{A_{j_1}} = \frac{V_{j_1}(V_{j_1}-V)}{(V_{j_1}+V)^2} \tag{13}$$

If now for instance $V_{j_1}=1.2V$ $$\frac{A_{j_2}}{A_{j_1}} = \frac{1.2(1.2-1)}{(1.2+1)^2} = 0.05 \tag{14}$$

This shows that in the limiting case where the inducted air had $V_a=0$ the cross section of the jet is only 5% of the area a jet would have if the approach velocity $V_a=V$ the speed of flight.

The Equation 11 is the special case $V_a=0$ of the general case where $V_a$ has values from 0 to V. The general expression is $$\frac{A_{j_n}}{A_{j_1}} = \frac{V_{j_1}(V_{j_1}-V)}{V_{j_n}(V_{j_n}-V_a)} \tag{15}$$

where $A_{j_n}$ represents the jet cross sectional area at exist corresponding to the jet velocity $V_{j_n}$ for various values of $V_a$ lying between 0 and V. This is for equal thrusts as before.

For equal efficiencies $$E_n = \frac{2V}{V_{j_n}+V_a} = E_1 = \frac{2V}{V_{j_1}+V} \tag{16}$$

from which $$V_{j_n} = V_{j_1}+V-V_a \tag{17}$$

Substituting in Equation 15 gives $$\frac{A_{j_n}}{A_{j_1}} = \frac{V_{j_1}(V_{j_1}-V)}{(V_{j_1}+V-V_a)(V_{j_1}+V-2V_a)} \tag{18}$$

Equation 18 is plotted in Fig. 1a for a range of values $V_a/V$.

Where $V_a=0$ the value of $A_{j_n}/A_{j_1}$ becomes 0.05 as given above in Equation 14.

When $V_a=V$, then $A_{j_n}/A_{j_1}$ is 1. This is the case where the propulsive device takes in air having the relative velocity of flight.

If the propulsive device takes in the portion of the boundary layer so that the average velocity is $0.5V$ then $A_{j_n}$ is about $0.12 V_{j_1}$. That is the necessary cross section of the jet is only 0.12 of the cross section required if the air approached at $V_a=V$. Both jets would give the same thrust and the same efficiency.

Actually in practice only about half the boundary layer needs to be inducted so that $V_a$ is about $0.25V$ and $A_{j_n}$ becomes about 0.075 of the area $A_{j_1}$.

It is to be noted that there is a critical zone about the point $V_a/V=0.75$, to one side of which the curve steepens rapidly and to the other side of which the curve flattens rapidly.

At the point $V_a/V=0.75$ the jet is made up of 50% boundary layer air having an average velocity of $0.5V$ and 50 per cent of air obtained from the wind stream of velocity V.

It may be further noted that if the propulsive jet is made up of 0.50 boundary layer air of average velocity $0.5V$ and of 0.50 ambient air of velocity V the average velocity $V_a$ for the whole jet is 0.75 and the ratio $A_{j_n}/A_{j_1}$ is about 0.22 and this ratio is about twice the value at $V_a=0.5V$ where all the jet air is boundary layer air of average velocity $V_a=0.5V$.

Another feature of the invention resides in the use of boundary layer air or other air which can reach the compressor by a short duct path to keep down duct losses of energy. This is particularly important for helicopter wings which have very small cross sectional areas for their span.

The propulsion of helicopter rotors has proved to be a very difficult subject when low fuel consumption is sought. In fact there is no method extant which operates with economy of fuel.

The propulsion of the helicopter is connected with the problem of compensating for the torque driving the rotor. In present practice the countertorque is opposed by a countertorque propeller at the tail of the fuselage, or by counterrotating lifting rotors.

The method of propulsion by a jet discharged from the blade avoids a torque reaction on the fuselage but is not very efficient.

Both the tail propeller and the counterrotating rotor are wasteful of energy in hovering flight, in the former because of the slipstream losses and in the latter because the total disk area of the two rotors is only about half that of a single rotor of the same overall span as two side by side rotors again leading to high slipstream or induced velocity losses. Furthermore both have power transmission losses and losses due to structural resistances and weight.

Current jet propulsion types are wasteful of fuel because of the high fuel consumption of jet engines of all types. The pulse jet and the ram jet (athodyd) have been proposed or used but both have given very large fuel consumptions.

There are marked advantages in using a jet engine drive if the problem of the fuel economy can be solved. A single lifting rotor of light weight could be used and the jet engine could be simple and lower in first cost.

This invention discloses a propulsion means which is very economical of fuel.

The applicant has constructed rotors driven by cold jets of large mass along the lines set forth in his U. S. Patent No. 2,041,796 issued May 26, 1936. These compare in efficiency of propulsion with rotors having countertorque propellers or rotors, but the fuel economy is still not good enough for wide commercial use. One of the principal factors which contribute to the poor economy is the duct loss in conveying the air for the jet from the fuselage through the interior of the wings to the discharge nozzle. Also to get adequate thrust, the jet velocity must be rather high. This leads to a poor jet efficiency which follows the well known formula for each radially disposed element of the blade, namely $$E = \frac{2}{1+V_j/V} \quad (19)$$

Where V is the wing element speed and $V_j$ is the jet velocity discharged from the element of blade being propelled. The higher $V_j$ the lower the efficiency. With the largest mass which can be accommodated through the blade interior the value of E is not likely to reach 80 per cent.

Therefore if the fuel economy of the propulsion means (for hovering or vertical climb) is to compare with airplanes using reciprocating engines driving propellers the power plant must be very economical of fuel to offset the additional losses of the jet drive, the duct losses, and other accessory mechanical losses.

This invention discloses that a very low fuel consumption for the overall propulsion effort is achieved by employing a high temperature turbine, an auxiliary compressor properly located with respect to the turbine and a heat exchanger transferring heat from the exhaust gases of the turbine to a large mass jet pumped by the auxiliary compressor which is driven by the high temperature gas turbine.

The success of the machine is related to the use of a high inlet gas temperature for the turbine. This is so because as the applicant has discovered, the size and weight of a heat exchanger is closely inversely as the inlet temperature of the turbine whose hot exhaust serves as a source of heat for the exchanger. Thus if the exhaust gas is at a high temperature (but low pressure), heat can be transferred to a cold jet at a high pressure with a resultant gain in efficiency or fuel economy. The success is dependent on the high temperature for the reason also that the fuel economy will be increased by operating the turbine at a high temperature and driving the auxiliary compressor mechanically rather than leaving the energy in the turbine motive gas to be discharged as a propulsive jet. In this invention both the main propulsive jet and the jet from the turbine are relatively cool and each has a relatively low jet velocity. The energy in this propulsive jet is preferably a multiple of the energy in the exhaust from the turbine.

Referring now to the drawings the fuselage 10 is propelled forward by the propeller 12, and engine 13. It is sustained by the rotor 14 having the wings 16.

The rotor is rotated by a power plant within the wing and providing a propulsive jet out the slot 18 near the wing tip. The power plant is comprised of the turbine compressor 20 driven by the turbine 22 and the combustion or heating chamber 21. The turbine also drives the propulsive compressor 24. Both compressors induct air through the slots 26 and 28.

The turbine 22 discharges its exhaust into the heat exchanger 30 to heat the compressed air from the compressor 24 which is sent through the exchanger in out-of-contact heat exchange relation with the exhaust gas.

The turbine 22 drives the propulsive compressor by means of a suitable driving connection, for instance gearing, housed in the case 32.

In another form of the invention shown in Figs. 6 to 9 the flow losses within the wing are reduced to a very small amount by transmitting the compressed air through the wing to the turbine at a high pressure, for instance at about 6 atmospheres or even more, rather than have a compressor at the turbine sucking air through the wing surface. The sucked air would have a low density and a high velocity whereas the compressed air has a very high density and a low velocity. Hence the rubbing losses are very small in proportion to the energy transported and consequently the air can be transported a long distance and through passage bends.

When air is transmitted through a duct the frictional losses depend on the velocity of flow, but the energy transmitted depends on the product of static pressure and volume per second. The pressure is not destroyed by the friction. Hence if most of the energy is in static pressure, the energy can be transmitted very efficiently.

In Figure 6 compressed air is supplied to the hub end of the wing 50 by the compressor 52 in the fuselage 10, driven by the engine 54. The air is compressed to a compression ratio preferably of about 6 or more and while at this pressure flows through the duct 56 into the wing and to the heater 60 which heats the air before it enters the turbine 62. The turbine uses its power to drive the main propulsive compressor 64 which handles a substantially greater mass of air per second than the turbine, preferably a multiple thereof. This compressor air is compressed to a pressure higher than the pressure of the exhaust gas from the turbine, but preferably lower than the pressure in duct 56.

The compressor inducts its air through the inlet 57 and duct 58. The inlet 57 is closely adjacent to the inlet of the compressor and thereby keeps the internal duct losses to a minimum.

The exhaust gas from the turbine 62 and the compressed air from the compresor 64 flow through the heat exchanger 66 in out-of-contact heat exchange relation into the mixing chamber 70 of the wing serving the slot 18 where the air and the turbine exhaust gas may mix before issuing from the slot.

The delivery of highly compressed air to the inlet of the turbine presents the great advantage of a simple means of starting the turbines outboard in the wing. Not only is the starting simplified but the space in the wings which otherwise would have to be devoted to a starter is saved and the disadvantage of the weight in the helicopter wing is also avoided.

Another advantage of the delivery of precompressed air into the helicopter wing for the turbine is that the air pressure at the turbine inlet remains constant. This is a great advantage in avoiding vibration in the turbine and wing structure. Where the turbine inlet takes in the relative wind passing the helicopter wing the inlet is subjected to great pressure variation as the wing changes from the advancing to the retreating position and vice versa.

Although Fig. 7 shows the propulsive air inducted through the forward facing inlet 40, the air may also be boundary layer air inducted through slots such as are shown in Figs. 2 and 3. To keep the heat exchanger and wing cross sections to a minimum boundary layer air should be used for the jet but substantial gains are available from the arrangement of Fig. 7 due to the manner of supplying the turbine with compressed air, of reducing duct losses due to the close positioning of the air intake, and of operating the turbine at a substantially high inlet temperature proper for said compressed air pressure.

Figs. 12 to 14 show the compressor 64 served with boundary layer air from the slots 72 and 74 in the wing 75. The heater 60 is fed with compressed air by the duct 76 communicating at the root end of the wing with duct 56.

The discharge from the heat exchanger 66 enters the chamber 70a and issues through the slot 18a formed by the lapping of the flap 80 with the upper wing wall.

The spar 82 has a suitable series of nozzles spaced spanwise to emit the fluid from the chamber.

At a turbine inlet temperature of about 1500° F. the amount of power going to the turbine compressor to drive it is about equal to the net power output of the turbine. For instance the power to drive the turbine compressor is about equal to that available in the motive gas to form the propulsive jet. In other words, the turbine produces about twice as much power as required to drive the turbine compressor. Only half of this total power is available outside the turbine power plant as net power.

As the inlet temperature increases the proportion of the turbine power required for the turbine compressor shrinks until it is a very small fraction of the total turbine power.

Also at about 1500° F. the excess quantity of air over that necessary to furnish oxygen for complete combustion of the fuel is quite large, being of the order of 3 times. However as the inlet temperature increases the excess air shrinks so that for a conventional turbo-jet the air mass becomes too small for efficiency.

Because the gas mass has decreased and because the majority of the available energy is left in the motive gas, in an ordinary jet engine the gas is discharged with a very high jet velocity leading to a low jet efficiency E which offsets the gain thermal efficiency arising from a high inlet temperature.

At about 2000° the decline in gas mass flow and the retention of most of the available energy in the motive gas becomes critical with respect to the overall propulsive efficiency of a jet engine.

A high jet velocity is especially serious for helicopters because it is not practical to operate helicopter wings at high speeds as compared to airplanes. If a helicopter is designed to land safely without power (with autorotation) the helicopter rotor diameter and tip speed are determined and since the wing acts at a lift coefficient close to the most efficient value the tip speed is closely determined for the case of sustention by power. In fact if the rotor is made large enough in diameter to give a safe vertical descent without power, the rotor diameter is such that the engine cannot rotate it at a very greatly different tip speed than that of autorotation. Hence the tip speed is of the order of 500 feet per second whereas jet propelled airplanes have speeds of 1000 feet per second or more and it is well known these machines are wasteful of fuel even at 1500 feet per second.

The present invention discloses means to reconcile the use of high inlet temperature which leads to high thermal efficiency for the power plant but to a high velocity jet of low mass, with the need for a high mass jet of low velocity relative to the helicopter wing speed to provide a high overall propulsive efficiency.

By using the boundary layer air to form the propulsive jet or jets which provide the major propulsive force for the aircraft, the mass flow of the jet is reduced to a very small fraction of what it would be if the ambient air were used. Thus the cross sectional area of the flow is very small and a heat exchanger to encompass it is very small. It is so small that it becomes practical to place a heat exchanger within the helicopter wing.

Since the heat exchanger is small and limited in cross section it can only accommodate a hot exhaust gas flow of small and limited cross section. This is provided by a gas turbine whose inlet temperature is large for then enough heat can be transferred to the boundary layer air in the heat exchanger even though only a small mass flow of hot gas goes through the exchanger.

Furthermore since the flow cross section is very small the diameter of the compressor is small enough to be housed wholely within the helicopter wing.

Also the high inlet temperature reduces the diameter of the turbine so that it can be housed within the wing, even in side by side relation with the compressor it must drive.

A turbine rotor 90 to operate at a temperature higher than 2000° F. is shown in Fig. 10. Its blades 92 have slots 94 which are supplied with a flow of cool air issuing from the slots to interpose a protective layer of cool air between the hot motive gas and the blade surface. These are discussed further in my Patent No. 2,489,683 issued November 29, 1949.

Air enters the turbine rotor 90 at 96 and flows radially outward to the slots 94 in the nose of the blade via the radial ducts 98. The air issues from the slots and flows chordwise, that is transversely to the radius, toward the trailing edge of the blade. The shape of the slots insures a broad band of protective fluid over the nose of the blade for all angles of approach of the hot motive gas.

Cooling air is conducted to the opening 96 by the duct 100 and the passage 102 through the stator blade 104.

The high inlet temperature of the turbine keeps the turbine diameter small so that the major portion of the cross section of the wing interior can be devoted to the more efficient cold air flowing within the wing.

When the mass of air compressed by the propulsive compressor equals or exceeds the mass of air flowing through the turbine the temperature of the turbine exhaust can be reduced to a value that is practical for the helicopter wing material adjacent the wing slot.

For instance if the cycle temperature is 2500° F. the exhaust temperature will be about 2000° and this will be reduced by the exchanger to about 1000° F. The outer portions of the wing will be able to operate safely at this temperature.

Although in the helicopter the preferred position of the turbine or propulsive compressor is at about forty per cent of the wing span measured from the root end, it is also possible to locate the turbine and/or the propulsive compressor quite close to the blade tip. This is particularly true in the case of the use of the compressor in the fuselage to serve the wing turbine with air at a high pressure ratio.

The reduction in weight of the heat exchanger attendant upon the use of the boundary layer is important for my aircraft power plant.

While the discussion has been directed chiefly to the propulsion of helicopters, and helicopter wings it is to be understood that the same propulsion power plant is intended for the propulsion of any aircraft or wing. The wing for instance of Fig. 12 may be considered mounted on a fuselage in fixed relation thereto at its root end.

The term fuel means is used to designate any prime source of heat including chemical and atomic sources.

The hub or root end of the wing is the end opposite the tip end. The term inboard refers to the side of a part toward the root end while outboard refers to the side toward the tip end of the wing.

While I have illustrated a specific form of this invention it is to be understood that I do not intend to limit myself to this exact form but intend to claim my invention broadly as indicated by the appended claims.

I claim:

1. In combination in a helicopter, a wing mounted for rotation about an upright axis to sustain the helicopter, said wing having a surface induction slot along the inner portion thereof and a rearward directed discharge slot in the surface of the outer portion of said wing, a gas turbine positioned outboard within said wing along the central half of the wing span with said induction slot on the inboard side of said turbine and said discharge slot on the opposite side thereof, the inlet of said turbine being in communication with said induction slot to induct air therethrough, a heat exchanger adapted to receive hot exhaust gas from said turbine for flow therethrough, means to discharge said exhaust gas from said exchanger rearward from the outer portion of said wing, means to convey relatively cool air from said induction slot through said exchanger to said discharge slot for flow therethrough, said exchanger being adapted to transfer heat from said exhaust gas to said cool air in out-of-contact heat exchange action thereby cooling said exhaust gas and heating said cool air to convert them to low temperature propulsive jets for propelling said wing efficiently.

2. In combination in a helicopter, a wing mounted for rotation about an upright axis to sustain the helicopter, said wing having a surface induction slot along the inner portion thereof and a rearward directed discharge slot in the surface of the outer portion of said wing, a gas turbine positioned outboard within said wing along the central half of the wing span with said induction slot on the inboard side of said turbine and said discharge slot on the opposite side thereof, said turbine having an inlet for the induction of air therethrough, a heat exchanger adapted to receive hot exhaust gas from said turbine for flow therethrough, means to discharge said exhaust gas from said exchanger rearward from the outer portion of said wing, means to convey relatively cool air from said induction slot through said exchanger to said discharge slot for flow therethrough, said exchanger being adapted to transfer heat from said exhaust gas to said cool air in out-of-contact heat exchange action thereby cooling said exhaust gas and heating said cool air to convert them to low temperature propulsive jets for propelling said wing efficiently.

3. In combination in a helicopter, a wing mounted for rotation about an upright axis to sustain the helicopter, a gas turbine having a turbine rotor mounted for rotation therein, said turbine being positioned within said wing along the central half portion of the span thereof, means to supply compressed air through the interior of the inboard portion of said wing to the inlet of said turbine at a compression ratio at least as great as 4 to transmit said air through said wing in a dense state to conserve energy, means adjacent said inlet to heat said air enroute to said turbine to provide power for said turbine, said turbine emitting said air as an exhaust gas, a compressor within said wing near said turbine and driven thereby, said compressor having its inlet in communication with an adjacent source of air, a heat exchanger within said wing adapted to conduct therethrough said air from said compressor and the exhaust gas from said turbine in out-of-contact heat exchange relation to heat said air and cool said gas, said blade having nozzle means adapted to discharge said exhaust gas and air rearward to provide an efficient propulsive force.

4. The combination of claim 3 wherein said adjacent source of air is boundary layer air on the wing surface.

5. In combination in a helicopter, a wing mounted for rotation about an upright axis to sustain the helicopter, a gas turbine having a turbine rotor mounted for rotation therein, said turbine being positioned within said wing along the central half portion of the span thereof, means to supply compressed air through the interior of the inboard portion of said wing to the inlet of said turbine at a compression ratio at least as great as 4 to transmit said air through said wing in a dense state to conserve energy, means adjacent said inlet to heat said air enroute to said turbine to a temperature greater than 2000° F. to provide power for said turbine with a limited amount of air, said turbine emitting said air as a hot exhaust gas, a compressor within said wing near said turbine and driven thereby, said compressor having its inlet in communication with an adjacent source of air, a heat exchanger within said wing adapted to conduct therethrough said air from said compressor and the exhaust gas from said turbine in out-of-contact heat exchange relation to heat said air and cool said gas, said wing having nozzle means adapted to discharge said exhaust gas and air rearward to provide an efficient propulsive force.

6. In combination in a helicopter, a wing mounted for rotation about an upright axis to sustain the helicopter, a gas turbine positioned within said wing along the central half of the wing span, a compressor within said wing driven by said turbine to deliver compressed air through the interior of said wing, means to supply said turbine with compressed air heated to a temperature greater than 2000° F. at a pressure ratio greater than 4 so as to drive said compressor to compress a greater mass of air per second than that flowing through said turbine, a heat exchanger housed within said wing adapted to receive exhaust air from said turbine and said compressed air from said compressor in out-of-contact heat exchange action to heat said compressed air, and means to discharge the flows of air from said exchanger rearward with respect to said wing to provide an efficient propulsive thrust, said heat exchanger being positioned outboard with respect to both said turbine and said compressor.

7. In combination in a helicopter, a wing mounted for rotation about an upright axis to sustain the helicopter, said wing having a surface induction slot along the inner portion thereof and a rearward directed discharge slot in the surface of the outer portion of said wing, a gas turbine positioned within said wing along the central half of the wing span, a compressor within said wing driven by said turbine to deliver compressed air tipward through said wing interior, said compressor having its inlet in communication with said induction slot to induct boundary layer air therethrough, means to supply said turbine with compressed air heated to a temperature greater than 2000° F. at a pressure ratio greater than 4 so as to drive said compressor to compress a greater mass of air per second than that flowing through said turbine, a heat exchanger adapted to receive exhaust air from said turbine and said compressed air from said compressor in out-of-contact heat exchange action to heat said compressed air, and means to discharge the flows of air from said exchanger through said discharge slot rearward with respect to said wing to provide an efficient propulsive thrust.

8. In combination in an aircraft, a wing, a surface having an induction slot for the induction of the boundary layer air, a gas turbine positioned within said wing adapted to produce power, a compressor within said wing, said compressor having its inlet in communication with said slot to induct boundary layer air, said compressor being operably connected to said turbine to be driven thereby, a heat exchanger adapted to receive exhaust gas from said turbine and compressed boundary layer air from said compressor for flow through said exchanger in out-of-contact heat exchange relation to heat said compressed air, and means to discharge said heated air rearward from said wing to provide an efficient propulsive thrust, said compressor having its axis of rotation parallel to the axis of said turbine and spaced chordwise therefrom.

9. In combination in a helicopter, a hollow rotary wing having a surface adapted to have a boundary layer of air form thereon, said surface being permeable to said air, a gas turbine positioned within said wing a substantial distance outward from the root end of said blade, means to deliver compressed air to the interior of said blade through said root end at a pressure at said turbine inlet greater than 4 times the atmospheric pressure, said turbine having an inlet to receive said compressed air into said turbine, fuel means to heat said air enroute to said turbine to provide for turbine power, a compressor operably connected to said turbine to be driven thereby, said compressor having its inlet in communication with said surface to induct boundary layer air into said wing, a heat exchanger within said wing adapted to receive compressed boundary layer air from said compressor and hot exhaust gas from said turbine for flow through said exchanger in out-of-contact heat exchange relation to heat said air, and means to discharge said heated air rearward to provide a propulsive thrust for propelling the aircraft with low fuel consumption.

10. In combination in a helicopter, a wing supported for rotation about an upright axis, said wing having a surface for the induction of boundary layer air therethrough along a major portion of said wing span, a turbine positioned within said wing, compressed air and fuel means to supply energy to said turbine adapting it to produce power, a compressor operably connected to said turbine to be driven thereby, said compressor having its inlet in communication with said surface to induct boundary layer air into said wing, a heat exchanger of limited cross section housed within said wing and adapted to receive compressed boundary layer air from said compressor and hot exhaust gas from said turbine for flow through said heat exchanger in out-of-contact heat exchange relation, and means to discharge said air rearward from said wing to propel it, said fuel means raising the temperature of said compressed air at said turbine inlet to a value greater than 2000° F. to cooperate with said heat exchanger of limited cross section in heating said boundary layer air flow with the exhaust gas flow of limited cross section from said turbine.

11. In combination in a helicopter, a wing supported for rotation about an upright axis, said wing having a surface for the induction of boundary layer air therethrough along a major portion of said wing span, a turbine positioned within said wing, compressed air and fuel means to supply energy to said turbine adapting it to produce power, a compressor operably connected to said turbine to be driven thereby, said compressor having its inlet in communication with said surface to induct boundary layer air into said wing, a heat exchanger of limited cross section housed within said wing and adapted to receive compressed boundary layer air from said compressor and hot exhaust gas from said turbine for flow through said heat exchanger in out-of-contact heat exchange relation, and means to discharge said air rearward from said wing to propel it, said fuel means raising the temperature of said compressed air at said turbine inlet to a value greater than 2000° F. to cooperate with said heat exchanger of limited cross section in heating said boundary layer air flow with the exhaust gas flow of limited cross section from said turbine, said compressor and turbine having their axes spaced chordwise and directed substantially along the span of said wing.

12. In combination in an aircraft, a wing, a gas turbine positioned within said wing outboard a substantial distance from the root end thereof, duct means within said wing extending outward from said root end to the inlet of said turbine, means substantially inboard from said turbine supplying the root end of said duct means with air at a compression ratio greater than 4 to reduce the duct losses, means adjacent said turbine to heat said air to a temperature greater than 2000° F. within said wing enroute to said turbine inlet, a compressor within said wing driven by said turbine and adjacent thereto to induct and compress other air to a pressure lower than said air in said duct means, a heat exchanger within said wing adapted to receive compressed air from said compressor and exhaust gas from said turbine for flow therethrough in out-of-contact heat exchange relation, and means to discharge said air from said exchanger out of said wing rearward as a propulsive jet.

13. In combination, a wing having a surface permeable to air along a major portion of its span and adapted to have a boundary layer of air form thereon, said wing having a limited chordwise cross section within, a turbine of limited cross section positioned within said wing, means to supply said turbine through the limited cross section of said wing with air at a compression ratio greater than 4, fuel means to heat said compressed air in said wing enroute to said turbine to a temperature greater than 2000° F. adapting it to be housed within said wing and to produce power and a high temperature exhaust gas, a compressor operably connected to said turbine to be driven thereby, said compressor having its inlet in communication with the inside of said surface along a major portion of the spanwise length thereof to induct boundary layer air into said wing, a heat exchanger of limited cross section housed within said wing, and means to direct said high temperature exhaust gas from said turbine and boundary layer air from said compressor to said heat exchanger for flow therethrough in out of contact heat exchange relation adapting said heat exchanger to be housed within the limited cross section of said wing, said heat exchanger heating said boundary layer air, said wing being adapted to discharge said heated boundary layer air rearward from said wing to propel it.

14. In combination, a wing having a surface permeable to air along a major portion of its span and adapted to have a boundary layer form thereon, said wing having a limited cross section within, a tubine positioned on said wing outboard from the root end thereof, means to supply said turbine through the limited cross section of said wing with air at a compression ratio greater than 4, fuel means to heat said compressed air enroute to said turbine to a temperature greater than 2000° F. adapting it to produce power and a high temperature exhaust gas, a compressor operably connected to said turbine to be driven thereby, said compressor having its inlet in communication with a major portion of the inside spanwise area of said surface to induct boundary layer air into said wing, a heat exchanger of limited cross section housed within said wing, means to direct said high temperature exhaust gas from said turbine and boundary layer air from said compressor to said heat exchanger for flow therethrough in out of contact heat exchange relation adapting said heat exchange to be housed within the limited cross section of said wing, said heat exchanger heating said boundary layer air, said wing being adapted to discharge said heated boundary layer air rearward from said wing to propel it.

15. In combination in an aircraft, an aircraft surface permeable to air along a major portion of its length transverse to the aircraft and adapted to have a boundary layer of air form thereon, a jet propulsion power plant adapted to be housed within a limited cross section of said aircraft comprising, a gas turbine, a compressor operably connected to said turbine to be driven thereby, said compressor being adapted to deliver compressed gas to said turbine for flow therethrough, a fuel means to heat said gas enroute to said turbine, a heat exchanger adapted to receive exhaust gas from said turbine for flow through said exchanger, and means driven by said turbine to induct boundary layer air inward through said surface as a flow of air separate from said flow of gas, said means to induct having a flow cross sectional area at inlet at least as great as that of said turbine at inlet adapting said means to induct to consume a major portion of the net power generated by said turbine, said exchanger being adapted to receive said inducted air for flow therethrough in out-of-contact heat exchange relation with said exhaust gas to heat said air, said compressor and said fuel means being adapted to cooperate to supply said gas flow to said turbine at a compression ratio greater than 4 and a temperature greater than 2000° F. to supply said exchanger with a high temperature exhaust gas stream of limited cross section from said turbine, said means to induct and said turbine by providing respectively said boundary layer air jet and said turbine exhaust stream both of limited cross section cooperating to give said exchanger a limited cross section, said exchanger being adapted to discharge said air flow rearward as a heated propulsive jet to propel said aircraft.

16. In combination in an aircraft, an aircraft surface permeable to air along a major portion of its length transverse to the aircraft and adapted to have a boundary layer of air form thereon, a jet propulsion power plant adapted to be housed within a limited cross section of said aircraft comprising, a gas turbine, a compressor means adapted to deliver compressed gas to said turbine for flow therethrough, fuel means to heat said gas enroute to said turbine, and a heat exchanger adapted to receive exhaust gas from said turbine for flow through said exchanger, said compressor means being adapted to induct boundary layer air inward through said surface as a flow of air separate from said flow of gas, said exchanger being adapted to receive said inducted air for flow therethrough in out-of-contact heat exchange relation with said exhaust gas to heat said flow of air, said compressor means and said fuel means being adapted to cooperate to supply said gas flow to said turbine at a compression ratio greater than 4 and a temperature greater than 2000° F. to supply said exchanger with an exhaust gas stream of limited cross section from said turbine, said compressor means and said turbine by providing respectively said boundary layer air jet and said turbine exhaust stream both of limited cross section cooperating to give said exchanger a limited cross section, said exchanger being adapted to discharge said exhaust gas and said air flow rearward to provide the chief propulsive thrust for said aircraft by jet action.

EDWARD A. STALKER.

REFERENCES CITED

The following references are of record in the file of this patent:

UNITED STATES PATENTS

| Number | Name | Date |
|---|---|---|
| 1,982,969 | Stalker | Dec. 4, 1934 |
| 2,041,796 | Stalker | May 26, 1936 |
| 2,084,464 | Stalker | June 22, 1937 |
| 2,092,077 | Knight et al. | Sept. 7, 1937 |
| 2,397,357 | Kundig | Mar. 26, 1946 |
| 2,464,651 | Pecker | Mar. 15, 1949 |
| 2,474,359 | Isacco | June 28, 1949 |
| 2,489,683 | Stalker | Nov. 29, 1949 |

FOREIGN PATENTS

| Number | Country | Date |
|---|---|---|
| 556,866 | Great Britain | Oct. 26, 1943 |
| 595,915 | Germany | Dec. 4, 1932 |